(12) United States Patent
Liu et al.

(10) Patent No.: US 6,240,487 B1
(45) Date of Patent: May 29, 2001

(54) INTEGRATED CACHE BUFFERS

(75) Inventors: Pei-Chun Peter Liu; Rajinder Paul Singh; Shih-Hsiung Stephen Tung, all of Austin; Dwain Alan Hicks, Pflugerville; Kin Shing Chan, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/025,606

(22) Filed: Feb. 18, 1998

(51) Int. Cl.[7] ................................................. G06F 12/08
(52) U.S. Cl. ............................ 711/127; 711/133; 711/143
(58) Field of Search ................................. 711/127, 133, 711/143, 118

(56) References Cited

U.S. PATENT DOCUMENTS 4,905,188 * 2/1990 Chuang et al. ...................... 711/128
5,680,572 * 10/1997 Akkary et al. ....................... 711/126
5,761,714 * 6/1998 Liu et al. .............................. 711/127

OTHER PUBLICATIONS

Chuang Sharon C–M. and Anni Bruss, "Architecture and Design of a Pseudo Two–Port VLSI Snoopy Cache Memory", CompuEuro '90. Proceedings of the 1990 IEEE International Conference on Systems and Software Engineering, May 1990: pp 400–407.*

* cited by examiner

*Primary Examiner*—Reginald G. Bragdon
(74) *Attorney, Agent, or Firm*—Anthony V. S. England; Bracewell & Patterson L.L.P.

(57) ABSTRACT

A cache has an array for holding data or instruction values, a buffer connected to the array, and means for accessing the buffer to retrieve a value for a processing unit. The accessing means uses wires having a pitch which is substantially equal to a wire pitch of the cache array. Multiplexers can be used with a plurality of such buffers to create a common output path. The cache can be interleaved, with the array being a first subarray, and the buffer being a first buffer, and further comprising a second subarray and a second buffer, wherein the first and second buffers separate the first and second subarrays. The invention can be applied to a store-back buffer as well as a reload buffer.

16 Claims, 4 Drawing Sheets

INTEGRATED CACHE BUFFERS

BACKGROUND OF THE INVENTION

1. Field of the Invention

The present invention generally relates to computer systems, and more particularly to a method of efficiently using buffers located in a cache memory of a processing unit of a computer system.

2. Description of Related Art

The basic structure of a conventional computer system includes one or more processing units connected to various input/output devices (such as a display monitor, keyboard, and permanent storage device), and a system memory device (such as random access memory or RAM) that is used by the processing units to carry out program instructions. The processing units communicate with the other devices by various means, including one or more generalized interconnects. A computer system may have many additional components such as serial and parallel ports for connection to, e.g., modems or printers, and other components that might be used in conjunction with the foregoing; for example, a display adapter might be used to control a video display monitor, a memory controller can be used to access the system memory, etc.

A typical processing unit includes various execution units and registers, as well as branch and dispatch units which forward instructions to the appropriate execution units. Caches are commonly provided for both instructions and data, to temporarily store values that might be repeatedly accessed by a processor, in order to speed up processing by avoiding the longer step of loading the values from the system memory (RAM). These caches are referred to as "on-board" when they are integrally packaged with the processor core on a single integrated chip. Each cache is associated with a cache controller or bus interface unit that manages the transfer of values between the processor core and the cache memory.

A processing unit can include additional caches, such as a level 2 (L2) cache which supports the on-board (level 1) caches. In other words, the L2 cache acts as an intermediary between system memory and the on-board caches, and can store a much larger amount of information (both instructions and data) than the on-board caches can, but at a longer access penalty. Multi-level cache hierarchies can be provided where there are many levels of interconnected caches.

A cache has many blocks which individually store the various instruction and data values. The blocks in any cache are divided into groups of blocks called "sets" or "congruence classes." A set is the collection of cache blocks that a given memory block can reside in. For any given memory block, there is a unique set in the cache that the block can be mapped into, according to preset mapping functions. The number of blocks in a set is referred to as the associativity of the cache, e.g., 2-way set associative means that for any given memory block there are two blocks in the cache that the memory block can be mapped into; however, several different blocks in main memory can be mapped to any given set.

An exemplary cache line (block) includes an address tag field, a state bit field, an inclusivity bit field, and a value field for storing the actual instruction or data. The state bit field and inclusivity bit fields are used to maintain cache coherency in a multi-processor computer system (indicating the validity of the value stored in the cache). The address tag is a subset of the full address of the corresponding memory block. A compare match of an incoming address with one of the tags within the address tag field indicates a cache "hit." The collection of all of the address tags in a cache is referred to as a directory (and sometimes includes the state bit and inclusivity bit fields), and the collection of all of the value fields is the cache entry array.

When all of the blocks in a set for a given cache are full and that cache receives a request, whether a read or write operation, to access another memory location that maps into the full set (a cache "miss"), the cache must evict one of the blocks currently in the set. The cache chooses a block by one of a number of means known to those skilled in the art (least recently used (LRU), random, pseudo-LRU, etc.) to be evicted. At the end of this process, the cache no longer holds a copy of the evicted block. If another copy of the value was not already present somewhere else in the memory hierarchy, then the value must be written back to system memory (or to some other cache).

For a high-speed processor device such as a superscalar, reduced instruction set computing (RISC) processor wherein more than one instruction can be executed during a single processor cycle, demands for simultaneous multiple accesses to the cache memory are increasing. The processor device may have to access more than one effective address and/or real address of the cache memory in a single processor cycle. Hence, a cache memory is often partitioned into multiple subarrays (interleaved) in order to achieve single-cycle, multi-port access. An interleaved cache memory has the potential of being accessed by more than one address and producing more than one output value in a single processor cycle.

Caches typically buffer a value that will be used to replace a line in the cache (cast-in) as a result of a cache miss. On a cache miss, the value is loaded into the cache reload buffer from memory, or from the next lower level in the memory hierarchy, and then forwarded to the requester. The value in the reload buffer is eventually loaded into the cache entry array. Caches similarly can buffer a value that is cast-out of a cache (evicted), presuming that a write-back is required, i.e., by the coherency state of the subject cache block. The value is loaded into a cast-out (or store-back) buffer from the cache, and forwarded to system memory, or otherwise propagated to another location in the memory hierarchy.

Buffers are used to reduce problems associated with trailing-edge latency. Otherwise, a considerable amount of wire (i.e., a large bus) would be required to dump the subarray contents into an external buffer, presenting additional problems. While these internal buffers can thus improve performance, they take up significant space in the cache and can be totally useless over long periods, i.e., those wherein no cache misses occur (for the cache reload buffer) and those wherein no cast-outs occur (for the cache store-back buffer). This inefficiency is exacerbated with interleaved caches that have separate reload and store-back buffers for each subarray in a given cache. It would, therefore, be desirable to devise an improved method of handling reload and cast-out values to provide more efficient cache utilization. It would be further advantageous if the method could be physically implemented in an efficient manner.

SUMMARY OF THE INVENTION

It is therefore one object of the present invention to provide an improved cache memory for a data processing system.

It is another object of the present invention to provide such a cache memory which has at least one buffer, such as a reload buffer or store-back buffer.

It is yet another object of the present invention to provide an improved method of managing internal cache buffers to provide more efficient cache utilization.

The foregoing objects are achieved in a cache for providing values to a processing unit of a computer system, generally comprising an array for holding a value, a buffer connected to the array, and means for accessing the buffer to retrieve the value for the processing unit. The accessing means preferably includes a plurality of wires having a pitch which is substantially equal to a wire pitch of the cache array. Multiplexers can be used with a plurality of such buffers to create a common output path. The cache is furthermore preferably interleaved, with the array being a first subarray, and the buffer being a first buffer, and further comprising a second subarray and a second buffer, wherein the first and second buffers separate the first and second subarrays. The invention can be applied to a store-back buffer as well as a reload buffer. In the case of a store-back buffer, the invention provides for copying of the value from the store-back buffer to a memory hierarchy of the computer system in one processor cycle. In the case of a reload buffer, the invention provides for copying of the value from the memory hierarchy to the reload buffer in one processor cycle.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
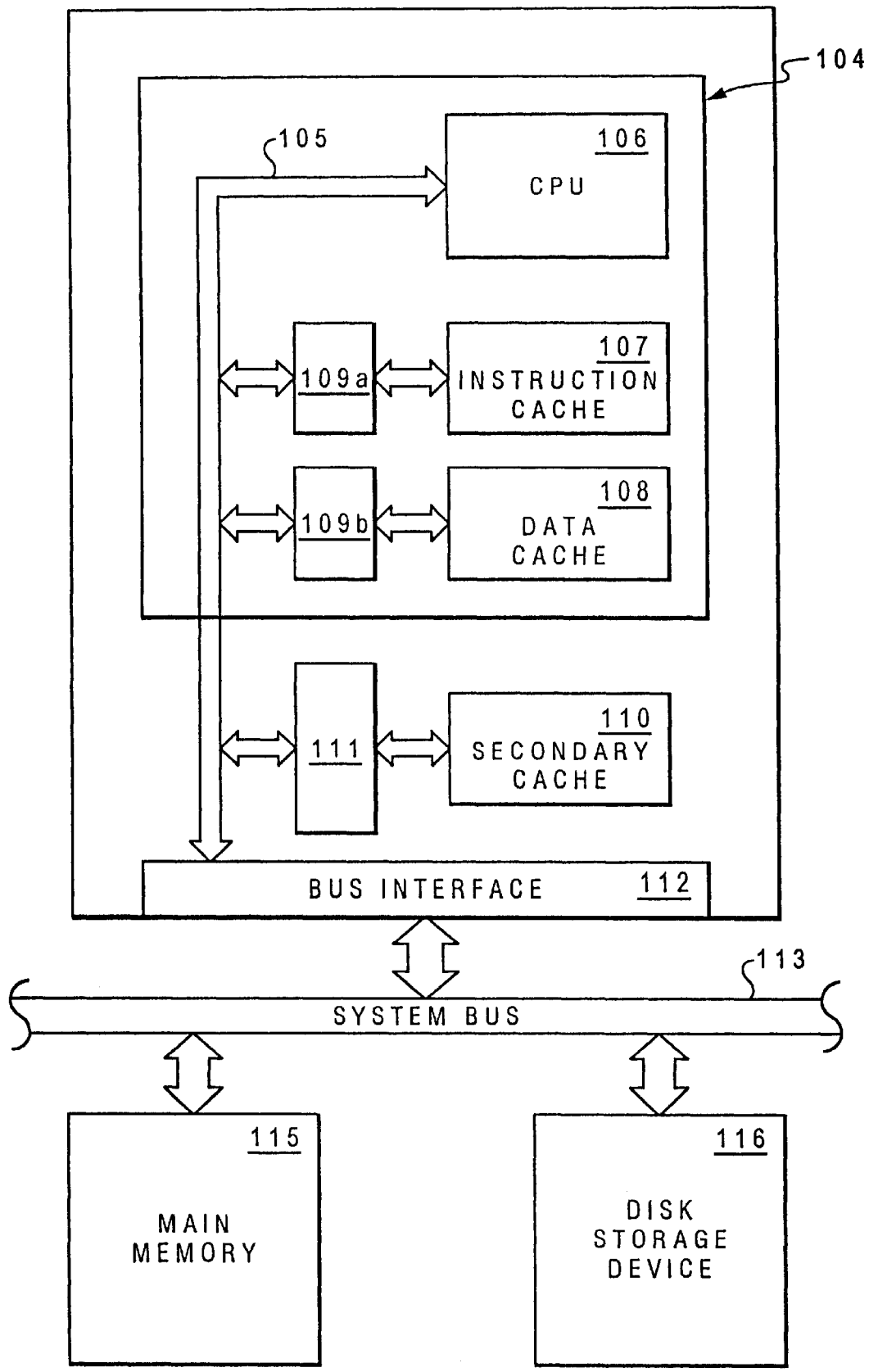
FIG. 1 is a block diagram of a data processing system having a cache memory according to one embodiment of the present invention.

With reference now to the figures, and in particular with reference to FIG. 1, there is illustrated a block diagram of a data processing system in which a cache memory may be incorporated according to one embodiment of the invention. In FIG. 1, only a single processor 104 is shown; however, the features of the present invention are also useful in a multi-processor system. Processor 104, having a CPU 106 which may be of a superscalar RISC type, is constructed as a single-chip device comprising on-chip instruction cache 107 and data cache 108. Both caches 107, 108 are connected to CPU 106 by separate paths within a local bus structure. Instruction cache 107 is connected to local bus 105 via cache controller 109a, while data cache 108 is connected to local bus 105 via cache controller 109b. A secondary cache 110 is also connected to local bus 105 via cache controller 111. Secondary cache 110 is much larger than either instruction cache 107 or data cache 108, and access to secondary cache 110 is also somewhat slower than to either instruction cache 107 or data cache 108. CPU 106 is also connected to system bus 113 via bus interface 112 in which timing and control translations between local bus 105 and system bus 113 are taking place. In addition, a main memory 115 and a disk storage device 116 are coupled to system bus 113 (possibly using one or more intervening buses, such as an I/O bus).

The memory hierarchy is from the fastest to the slowest, from the smallest to the largest, and from the most expensive per bit to the least expensive per bit, in progression from caches 107, 108 to secondary cache 110, to main memory 115, and to disk storage device 116. Main memory 115 contains a subset of what is in disk storage device 116, secondary cache 110 contains a subset of what is in main memory 115, and each of caches 107, 108 contains a subset of what is in secondary cache 110. CPU 106 can access caches 107, 108 within a processor cycle, while it may take several processor cycles to access secondary cache 110. If a cache miss occurs in caches 107, 108, and secondary cache 110, then main memory 115 is accessed to perform a cache linefill operation-replacing a cache line with an equivalent bit portion from main memory 115 which contains the addressed data. This cache linefill operation must be performed in order to satisfy the attempted cache access for which a cache miss occurred. If main memory 115 does not contain the location for which the cache linefill operation is attempted, then a page containing this data is obtained from disk storage device 116 such that the cache linefill operation can be completed. The time for acquiring a page from disk storage device 116 and writing it to main memory 115 may require many thousands of processor cycles, during which CPU 106 may be switched to do another task or stalled in order to wait for the data to satisfy the request.

In the depicted embodiment, any of the caches may be interleaved, i.e., arranged in subarrays to allow multi-port access. Two (or more) addresses which are presented to the cache in order to access different blocks can thus simultaneously access different subarrays. The interleaved cache(s) may include additional features, such as those disclosed in U.S. Pat. No. 5,761,714, which is hereby incorporated.

Figure 2:
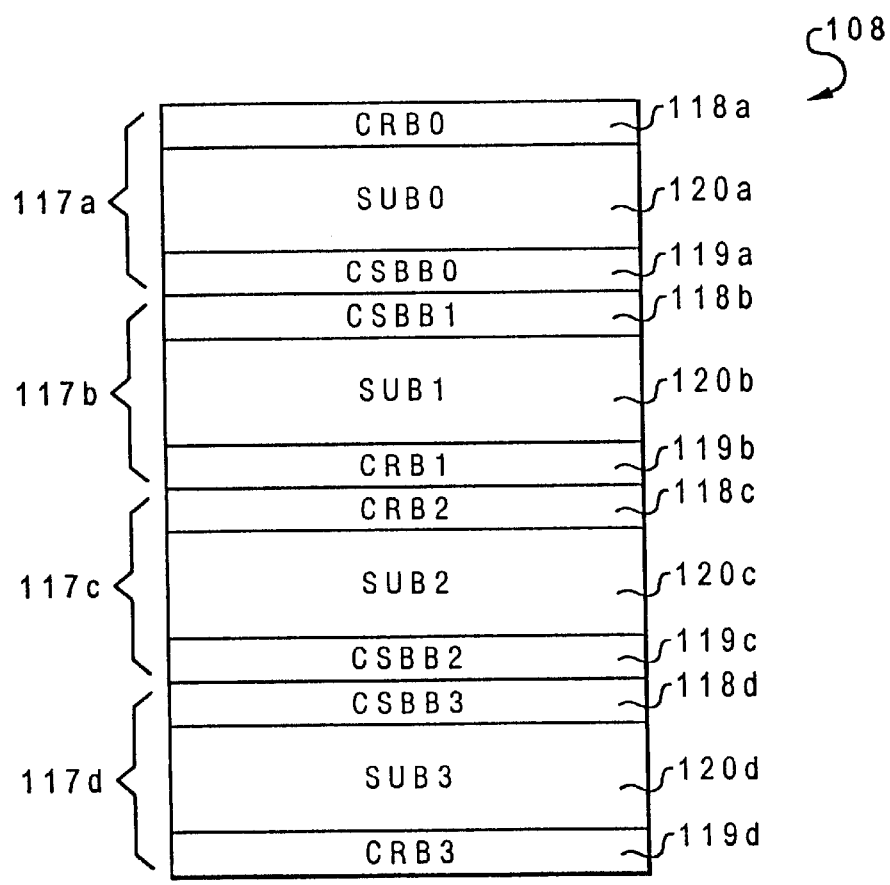
FIG. 2 is a block diagram of an interleaved cache which can be used with the embodiment of FIG. 1.

In one implementation, shown in FIG. 2, data cache 108 is interleaved by providing four blocks or subarrays 117a–117d. Each subarray 117a–117d preferably is substantially identical, and contains 128 cache lines. Each of these 128 cache lines is physically divided into two sections—an odd section and an even section. Each section is 512 bits wide. Thus, the cache entry array portion of a given subarray is 1024 bits wide and 128 lines deep, or a total of 16 kilobytes (8-bit bytes). By defining a double-word which is equal to 64 bits (or 8 bytes), each data cell in a given subarray is 8 double-words wide. In addition to the 1024-bit data field, each cache line has other fields such as a 128-bit parity field, and various control fields including odd and even fields used for a MESI cache coherency protocol.

Each of the subarrays 117a–117d has a respective cache reload buffer (CRB) 118a–118d and a respective cache store-back buffer (CSBB) 119a–119d. Data that is to be loaded into the data portions 120a–120d of a given subarray (in response to a cache miss) is first loaded into the associated cache reload buffer, and forwarded to the requester. The data in the reload buffer is loaded into the data portion of that subarray during the next cycle of the cache clock. Similarly, data that is to be cast-out of a given subarray (evicted) and written to another memory location, is first loaded into the associated store-back buffer, and then forwarded to the other location during the next clock cycle. Each buffer can hold a full cache line of data.

The present invention integrates one or more buffers of a cache, such as the reload buffer or the store-back buffer. In a preferred embodiment, both the CRBs 118a–118d and the CSBBs 119a–119d are integrated into the cache data unit, allowing direct access to a particular buffer. One advantage of this construction is reduced global wiring, since the CRBs, CSBBS, subarrays and related multiplexers all have a consistent wire pitch.

Figure 3:
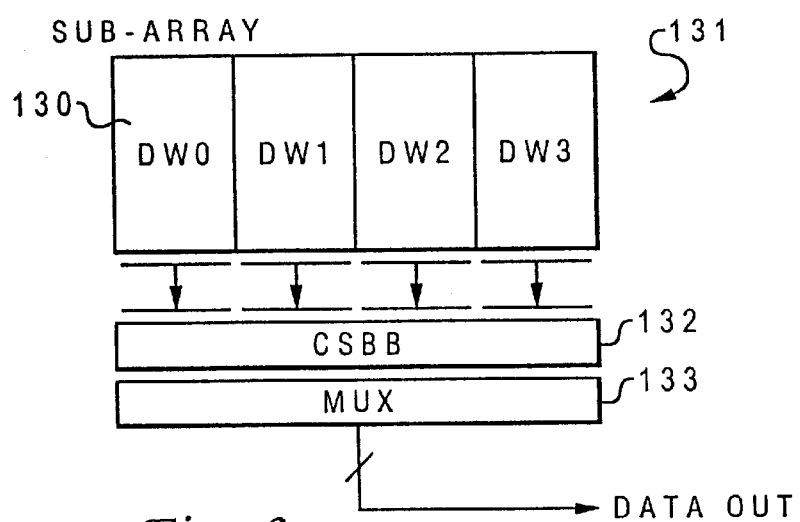
FIG. 3 is a block diagram depicting how a cache line may be loaded into a cache buffer and multiplexed out along a narrower path in accordance with the present invention.

FIG. 3 illustrates how an 8-word line 130 of a subarray 131 can be dumped into a CSBB 132 and accessed in accordance with the present invention. A multiplexer 133 is used to create a narrower output path. This arrangement is very efficient since all of the data is ported to CSBB 132 from the subarray on a line basis, and all of the bits of the line are available at the same time. The pitch of the CSBB function can be optimized with the pitch of the subarray (and support logic).

Figure 4:
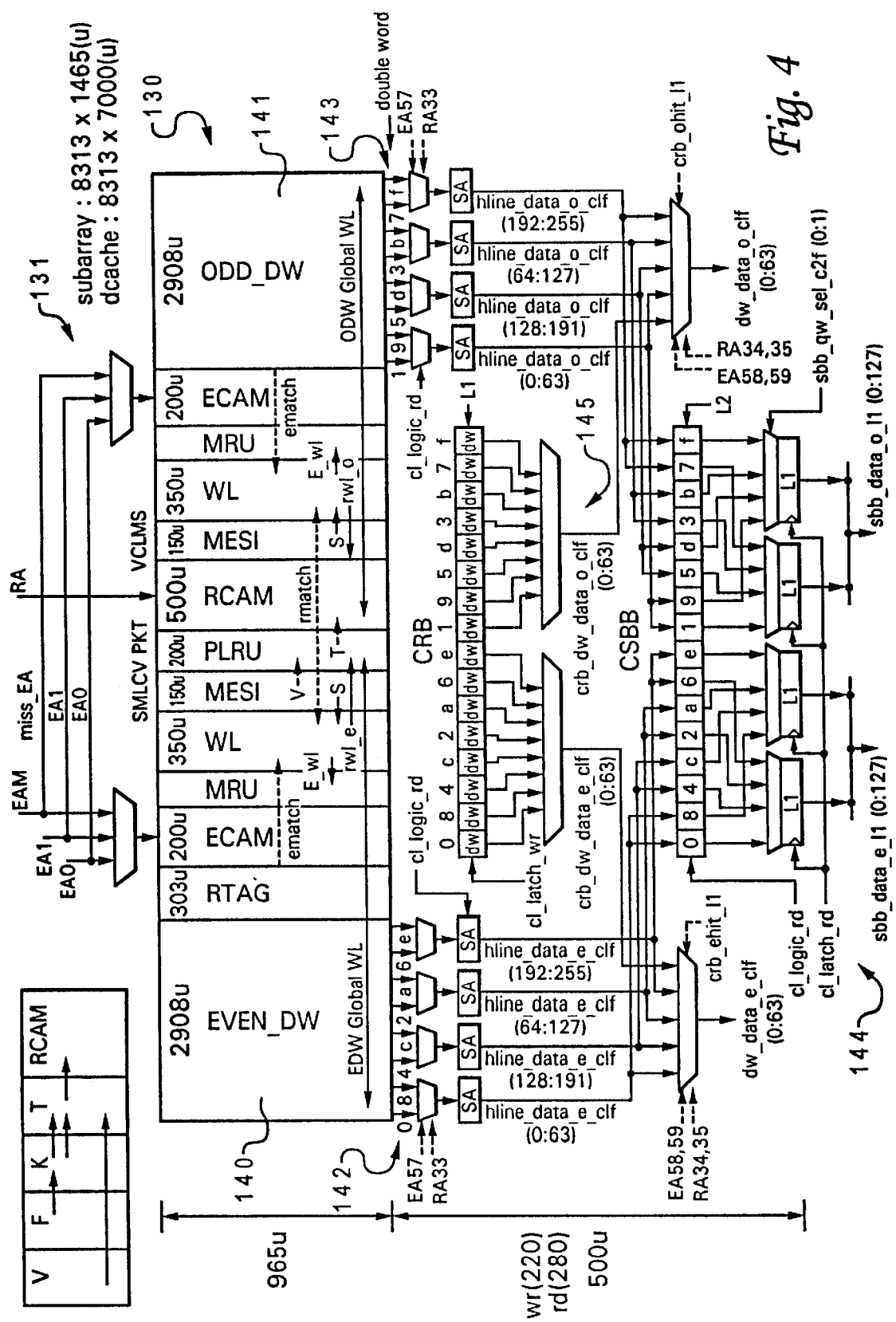
FIG. 4 is a detailed schematic diagram of one embodiment of a cache which may be used to implement the embodiment of FIG. 3.

With further reference to FIG. 4, the 8-word line 130 may include two data fields, an even section 140, and an odd section 141, along with various address fields and control fields, which are discussed in detail in the aforementioned U.S. Pat. No. 5,761,714. A first set of 2-to-1 multiplexers 142 and a second set of 2-to-1 multiplexers 143 are used to provide a narrower output path from the cache line, which is further connected to a store-back buffer 144. CSSB 144 has an effective 8-to-1 multiplexer to allow selection of one of the words in the cache line. FIG. 4 also depicts the cache reload buffer 145.

Figure 5:
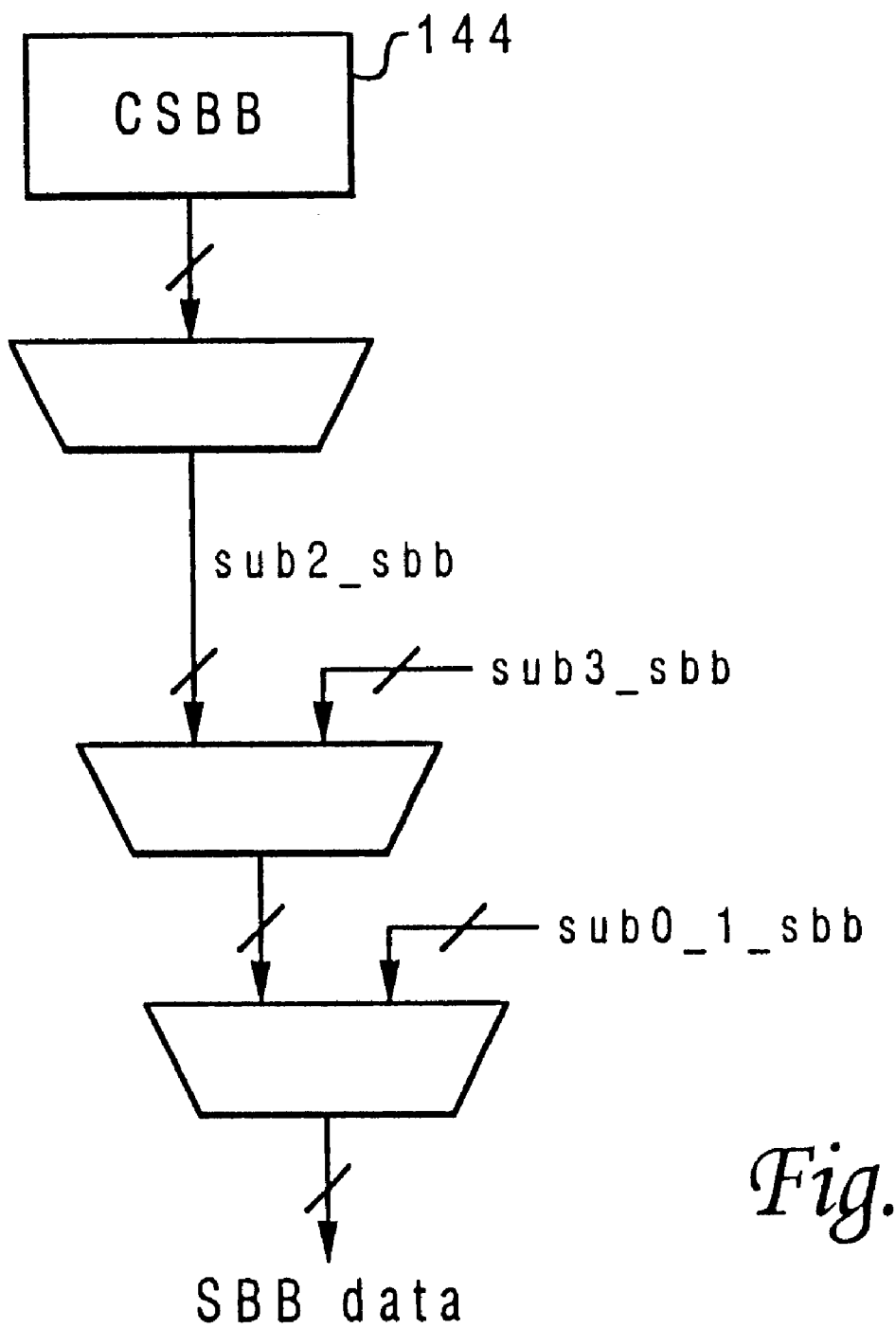
FIG. 5 is a schematic diagram of another variation of the present invention, depicting how a plurality of cache store-back buffers in a subarray can be multiplexed to provide a narrower store-back buffer path.

The cache store-back buffers from two or more subarrays can be additionally multiplexed to further narrow the CSBB output path. FIG. 5 illustrates the use of 2-to-1 multiplexers to allow the selection of data from one of four CSBBs (including CSBB 144) in cache 108. The buffers are multiplexed in different locations to reduce vertical wiring.

This arrangement provides the traditional function of a cast-out buffer of data forwarding and buffering in a single cycle. Furthermore, this aspect of the invention optionally provides the cache system with an extra line of data for each subarray since the cache controls permit access to the newly allocated line and the line(s) in the CSBB until the CSBB actually is invalidated. With this invention, the line in the CSBB need not be loaded into main memory until the CSBB is needed by another cache miss operation or to maintain coherency. A line that is aged out can have tags and controls associated with it as if it were still within the traditional cache array. Similarly, the invention can be applied to allow the traditional function of a reload buffer, of data forwarding and loading a line of data into the cache, in a single cycle as well, with another optional line of data since the controls again can be adapted to permit access to the line to be allocated until the line in the reload buffer actually replaces the cache line. With this invention, the line in the CRB need not be loaded in the subarray until the reload buffer is needed by another cache miss operation. This increases the overall bandwidth of the system, and allows faster cache accesses.

While the figures illustrate a data cache embodiment of the present invention, those skilled in the art will appreciate that it can be applied to an instruction cache as well, or a mixed cache holding instructions and data.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the CRBs and CSBBs could be used to hold more than one line at a time, or a partial line for caches that are sectored, and still be within the scope of the invention. It is therefore contemplated that such modifications can be made without departing from the spirit or scope of the present invention as defined in the appended claims.

What is claimed is:

1. A method within a computer system of efficient transfer of data to and from a processor cache that includes a plurality of interleaved subarrays, said method comprising the steps of:

concurrently processing multiple processor requests for data and castouts utilizing said plurality of interleaved subarrays, wherein multiple of said plurality of interleaved subarrays each processes a single one of said multiple processor requests utilizing a respective reload buffer and store-back buffer;

in response to a request that misses at said processor cache, loading data into an integrated cache reload buffer associated with a subarray among said plurality of interleaved subarrays;

transferring said data to said subarray in a subsequent processor cycle;

in response to a castout from said subarray, placing castout data into an integrated store-back buffer also associated with said subarray;

forwarding said castout data from said integrated store-back buffer to a memory location of said computer system in a subsequent processor cycle; and utilizing a plurality of vertically interconnected multiplexers, multiplexing the integrated cache store-back buffer with at least one other cache store-back buffer to create a first common output path and, multiplexing the first common output path with at least one other store-back buffer to create a second common output path.

2. The method of claim 1, wherein said step of placing the castout data into the integrated store-back buffer is performed in response to an issuance of a store instruction by the processor and includes the step of moving the data from the subarray to said integrated store-back buffer.

3. The method of claim 2, further comprising the step of moving the data from the integrated store-back buffer to said memory location.

4. The method of claim 2, wherein said moving step loads the integrated store-back buffer in one processor cycle.

5. The method of claim 1, wherein said step of loading the data into the integrated cache reload buffer is performed in response to the issuance of a load instruction by the processor and includes the step of moving the data from the integrated reload buffer.

6. The method of claim 5, further comprising the step of moving the data from a memory to the integrated reload buffer.

7. The method of claim 5, wherein said moving step loads the array in one processor cycle.

8. The method of claim 1, wherein said transferring step is completed when a next cache miss operation commences.

9. The method of claim 1, wherein said forwarding step is completed when a next castout occurs.

10. A cache for providing data to a processing unit of a computer system, the cache comprising:

a plurality of interleaved subarrays for holding data and which enable concurrent processing of multiple processor requests by said cache;

a plurality of reload buffers each connected to a subarray among said plurality of interleaved subarrays;

a plurality of store-back buffers each connected to a subarray;

a plurality of multiplexers including:
  a first multiplexer for multiplexing a first store-back buffer with a second store-back buffer connected to a second subarray of said plurality of interleaved subarrays to create a first common output path; and
  a second multiplexer vertically configured with said first multiplexer to reduce wiring, wherein said first common output path is multiplexed with a third store back buffer connected to a third subarray of said plurality of interleaved subarrays to create a second common output path and reduce vertical wiring; and means for concurrently processing multiple load requests and castouts at said subarrays utilizing said plurality of reload buffers and said plurality of store-back buffers, wherein said reload buffers and said store-back buffers provide additional cache bandwidth by holding load data and castout data, respectively, during load and store data transfer to and from a memory.

11. The cache of claim 10, wherein said cache includes a plurality of wires connecting said plurality of reload buffers and said plurality of store-back buffers to said plurality of interleaved subarrays, said plurality of wires having a pitch substantially equal to a wire pitch of said plurality of interleaved subarrays.

12. The cache of claim 10, wherein at least one of said plurality of reload buffers is physically located between said first subarray and said second subarray.

13. The cache of claim 10, further comprising means for moving the castout data from a store-back buffer in one processor cycle.

14. The cache of claim 10, further comprising means for transferring the load data to said reload buffer in one processor cycle.

15. The method of claim 10, wherein each store-back buffer holds an 8-word cache line, and is further coupled to an 8-1 multiplexer, wherein said 8-1 multiplexer selects one word from said 8-word cache line.

16. A processor comprising:

an instruction sequencing unit and a load store unit; and a cache connected to said load store unit, said cache including:
  a plurality of interleaved subarrays for holding data and which enable concurrent processing of multiple processor requests by said cache;
  a plurality of reload buffers each connected to a subarray among said plurality of interleaved subarrays;
  a plurality of store-back buffers each connected to a subarray;
  a plurality of multiplexers including:
    a first multiplexer for multiplexing a first store-back buffer with a second store-back buffer connected to a second subarray of said plurality of interleaved subarrays to create a first common output path; and
    a second multiplexer vertically configured with said first multiplexer to reduce wiring, wherein said first common output path is multiplexed with a third store back buffer connected to a third subarray of said plurality of interleaved subarrays to create a second common output path and reduce vertical wiring; and
  means for concurrently processing multiple load requests and castouts at said subarray utilizing said plurality of reload buffers and said plurality of store-back buffers, wherein said reload buffers and said store-back buffers provide additional cache bandwidth by holding load data and castout data, respectively, during load and store data transfer to and from said memory.

* * * * *